United States Patent
Koyama et al.

(10) Patent No.: US 11,075,420 B2
(45) Date of Patent: Jul. 27, 2021

(54) COIN-TYPE BATTERY AND MANUFACTURING METHOD THEREOF

(71) Applicant: Maxell Holdings, Ltd., Kyoto (JP)

(72) Inventors: Kunihiko Koyama, Kyoto (JP); Hirofumi Tagawa, Kyoto (JP); Toshihiko Ishihara, Kyoto (JP)

(73) Assignee: Maxell Holdings, Ltd., Kyoto (JP)

( * ) Notice: Subject to any disclaimer, the term of this patent is extended or adjusted under 35 U.S.C. 154(b) by 97 days.

(21) Appl. No.: 16/335,795

(22) PCT Filed: Dec. 27, 2017

(86) PCT No.: PCT/JP2017/046830
§ 371 (c)(1),
(2) Date: Mar. 22, 2019

(87) PCT Pub. No.: WO2018/124152
PCT Pub. Date: Jul. 5, 2018

(65) Prior Publication Data
US 2019/0252648 A1     Aug. 15, 2019

(30) Foreign Application Priority Data

Dec. 27, 2016   (JP) .............................. JP2016-252603
Sep. 12, 2017   (JP) .............................. JP2017-175241

(51) Int. Cl.
    *H01M 50/109*     (2021.01)
    *H01M 50/10*     (2021.01)
    (Continued)

(52) U.S. Cl.
    CPC ......... *H01M 50/109* (2021.01); *H01M 50/10* (2021.01); *H01M 50/147* (2021.01); *H01M 50/183* (2021.01)

(58) Field of Classification Search
CPC combination set(s) only.
See application file for complete search history.

(56) References Cited

U.S. PATENT DOCUMENTS

2001/0055715 A1    12/2001   Bennett
2011/0091753 A1    4/2011   Wang et al.
(Continued)

FOREIGN PATENT DOCUMENTS

JP      08-190900 A    7/1996
JP      08-222192 A    8/1996
(Continued)

OTHER PUBLICATIONS

International Preliminary Report on Patentability including Written Opinion of the International Searching Authority and English translation thereof of PCT/JP2017/046830 dated Jul. 11, 2019.
(Continued)

*Primary Examiner* — Ula C Ruddock
*Assistant Examiner* — Sarika Gupta
(74) *Attorney, Agent, or Firm* — Muncy, Geissler, Olds & Lowe, P.C.

(57) ABSTRACT

When a coin-type battery is manufactured using a sealing can in which a fold portion is not provided in a side wall portion, a coin-type battery with excellent reliability, which has excellent mass productivity and sealing properties and a capacity of which has been increased by increasing a housing space in which an electrode body is housed is manufactured. An open end portion of a side wall portion of a sealing can is formed not to bend toward an inner circumference side and an outer circumference side, an edge of the open end portion is formed not to have a sharp angle, a cut off portion is formed in an inner circumference side of an upper end portion, the sealing can is fitted to a gasket an inner diameter of which is made smaller than an external diameter of the side wall portion of the sealing can, an exterior can is caulked, thereby manufacturing a coin-type battery.

4 Claims, 10 Drawing Sheets

(51) Int. Cl.
    *H01M 50/147*      (2021.01)
    *H01M 50/183*      (2021.01)

(56) References Cited

U.S. PATENT DOCUMENTS

| | | |
|---|---|---|
| 2012/0028110 A1 | 2/2012 | Brenner |
| 2015/0118545 A1* | 4/2015 | Komatsu ............ H01M 2/0222 |
| | | 429/174 |
| 2015/0140456 A1 | 5/2015 | Allen |

FOREIGN PATENT DOCUMENTS

| | | | |
|---|---|---|---|
| JP | 2004-327280 A | | 11/2004 |
| JP | 2006-114233 A | | 4/2006 |
| JP | 2007-172859 A | | 7/2007 |
| JP | 2007-200682 A | | 8/2007 |
| JP | 2007273110 A | | 10/2007 |
| JP | 2008078158 A | | 4/2008 |
| JP | 2010040554 A | * | 2/2010 |
| JP | 2012190680 A | | 10/2012 |
| WO | 0169698 A1 | | 9/2001 |
| WO | 2015/073858 | | 5/2015 |

OTHER PUBLICATIONS

The extended European search report of the corresponding EP application No. 17888898.8 dated Jun. 4, 2020.

* cited by examiner

COIN-TYPE BATTERY AND MANUFACTURING METHOD THEREOF

TECHNICAL FIELD

The present invention relates to a coin-type battery and a manufacturing method thereof.

BACKGROUND ART

Flat shape batteries which are called coin-type batteries or button batteries have been known. In a battery of this type, an electrode body configured such that a separator is sandwiched between a positive electrode and a negative electrode is housed in a battery case with an electrolyte. The battery case includes an exterior can which has a bottom portion and a peripheral wall portion and in which an opening portion is provided in the peripheral wall portion, a sealing can which has a flat portion and a side wall portion and in which an opening portion and a shoulder portion are formed in the side wall portion, and a gasket that is arranged between the exterior can and the sealing can. The peripheral wall portion of the exterior can and the side wall portion of the sealing can are fitted together.

For batteries which have the above described structure, in order to increase an internal volume and thus increase capacity while efficiently applying a pressure to the gasket to seal in fitting of the exterior can and the sealing can, various examinations have been conducted for sealing structures of the exterior can and the sealing can.

As one of the sealing structures, it has been proposed to make a cross-sectional shape of the gasket into an L shape without providing a fold portion in the side wall portion of the sealing can (Patent Document 1). Using the above described sealing structure, an internal volume of the side wall portion can be increased, as compared to a structure in which the side wall portion of the sealing can is folded. Thus, the capacity of the battery can be increased.

It has been also proposed to increase adhesion of an edge portion of the side wall portion of the sealing can and the gasket, improve sealing properties, and thus, suppress the occurrence of leakage by making curvature radius of an inner circumference side portion of an edge of the side wall portion of the sealing can smaller than curvature radius of an outer circumference side portion and bending the opening portion of the side wall portion of the sealing can toward a center of the battery, in order to increase leakage resistance in a case in which a fold portion is not provided in the side wall portion of the sealing can (Patent Documents 2 and 3).

CITATION LIST

Patent Document

Patent Document 1: Japanese Laid-open Patent Publication No. 08-190900
Patent Document 2: Japanese Laid-open Patent Publication No. 08-222192
Patent Document 3: Japanese Laid-open Patent Publication No. 2007-200682

SUMMARY OF INVENTION

Problems to be Solved by Invention

However, as described in Patent Documents 1 and 2, if the edge portion of the side wall portion of the sealing can is made into a nearly linear shape in a longitudinal-sectional view of the sealing can, in some cases, when the gasket is attached to the side wall portion of the sealing can, the edge portion of the side wall portion scratches the gasket and thereby causes leakage. Moreover, as described in Patent Document 3, if the edge portion of the side wall portion is largely bent inwardly, a dead space that is generated inside the side wall portion of the sealing can is enlarged, and therefore, a problem occurs in which an effect of increasing the volume of the battery, which is achieved by employing a structure in which a fold portion is not provided in the side wall portion of the sealing can, is impaired.

Specifically, it has been found that, if an edge of an opening of the side wall portion has a sharp angle, a problem in which an edge of the side wall portion of the sealing can scratches a side surface of the gasket, a problem in which a portion that is pressed by the edge of the side wall portion is cut, or like problem is likely to arise and a leakage tends to occur.

Also, in order to reduce the dead space in the battery case and increase the capacity, it is necessary to form the shoulder portion in the side wall portion in a position that is located as close to the flat portion as possible and to preform sealing, using the sealing can in which the side wall portion is formed such that a prat of the side wall portion, which is closer to the opening portion than the shoulder portion, is located substantially perpendicular to the flat portion, such that a shape of the sealing can does not change as much as possible. However, it has been also found that there is a high probability that, when it is attempted to attach the gasket to the sealing can having the above described shape, the gasket is scratched or displacement of the gasket or the like occurs due to friction between the sealing can and the gasket because an area of the side wall portion of the sealing can, which contacts an inner surface side of the gasket, is large, and a leakage occurs after the battery is assembled.

It is an object of the present invention to increase a capacity without impairing the sealing properties by enlarging a housing space in which an electrode body is housed and to provide a coin-type battery with excellent reliability and a manufacturing method thereof.

Solution to Problem

A coin-type battery according to an embodiment of the present invention is a coin-type battery that includes an exterior can including a bottom portion and a peripheral wall portion and having an opening on an opposite side to the bottom portion in a thickness direction, a sealing can which includes a flat portion and a side wall portion and has an opening on an opposite side to the flat portion in the thickness direction and of which a stepped shoulder portion that is located between the flat portion and the opening and expands in a radial direction is provided in the side wall portion, a gasket at least a portion of which is arranged between the peripheral wall portion of the exterior can and the side wall portion of the sealing can, and a power generation element arranged in a housing space formed by the exterior can and the sealing can. The gasket includes a gasket peripheral wall portion formed to have a cylindrical shape and arranged between the peripheral wall portion of the exterior can and the side wall portion of the sealing can, and a gasket bottom portion arranged between the bottom portion of the exterior can and an open end portion of the side wall portion of the sealing can, and is an annular body having a hook-shaped cross section, and when it is assumed that an external diameter of the bottom portion of the exterior can is d1 (mm), an inner diameter of the open end portion in the peripheral wall portion of the exterior can is d2 (mm), an external diameter of the flat portion of the sealing can is d3 (mm), and an external diameter of the open end portion in the side wall portion of the sealing can is d4 (mm), $0.8 \leq d3/d1 \leq 0.9$ and $0.98 \leq d2/d4 \leq 1.06$ are satisfied.

In a manufacturing method of a coin-type battery according to an embodiment of the present invention, the coin-type battery includes an exterior can, a sealing can, a gasket arranged between the exterior can and the sealing can, and a power generation element arranged in a housing space formed by the exterior can, the sealing can, and the gasket. The exterior can includes a bottom portion and a peripheral wall portion and has an opening on an opposite side to the bottom portion in a height direction, the sealing can includes a flat portion and a side wall portion and has an opening on an opposite side to the flat portion in the height direction, and the side wall portion of the sealing can includes a base end portion, a diameter expansion portion, and a stepped shoulder portion that expands in a radial direction. The gasket is an annular body that includes a gasket peripheral wall portion arranged between the peripheral wall portion of the exterior can and the side wall portion of the sealing can and formed to have a cylindrical shape and a gasket bottom portion arranged between the bottom portion of the exterior can and an open end portion of the side wall portion of the sealing can and has a hook-shaped cross section, and includes a cut off portion in an inner circumference side of an upper end portion of the gasket peripheral wall portion. Furthermore, when a height of the sealing can is h1 (mm), in the side wall portion of the sealing can, an external diameter of the open end portion is d5 (mm), an external diameter and a can thickness in a position at 7/10 of h1 from an edge of the open end portion toward a flat portion side are d6 (mm) and t1 (mm), respectively, and a can thickness in a position at ½ of t1 from the edge of the open end portion toward the flat portion side is t2 (mm), and an inner diameter of the gasket peripheral wall portion in a portion other than the cut off portion is d7 (mm), $-0.1 \leq d5-d6 \leq 0.1$, $d6>d7$, and $t2/t1 \geq 0.9$ are satisfied. The manufacturing method of a coin-type battery includes a step of fitting the side wall portion of the sealing can to an inner side of the gasket peripheral wall portion, and a step of caulking the peripheral wall portion of the exterior can to seal.

Advantageous Effects of Invention

By using a coin-type battery according to an embodiment of the present invention and a manufacturing method thereof, a coin-type battery a capacity of which has been increased by increasing a housing space in which an electrode body is housed and which has excellent reliability can be achieved without impairing sealing properties.

DESCRIPTION OF EMBODIMENTS

Figure 1:
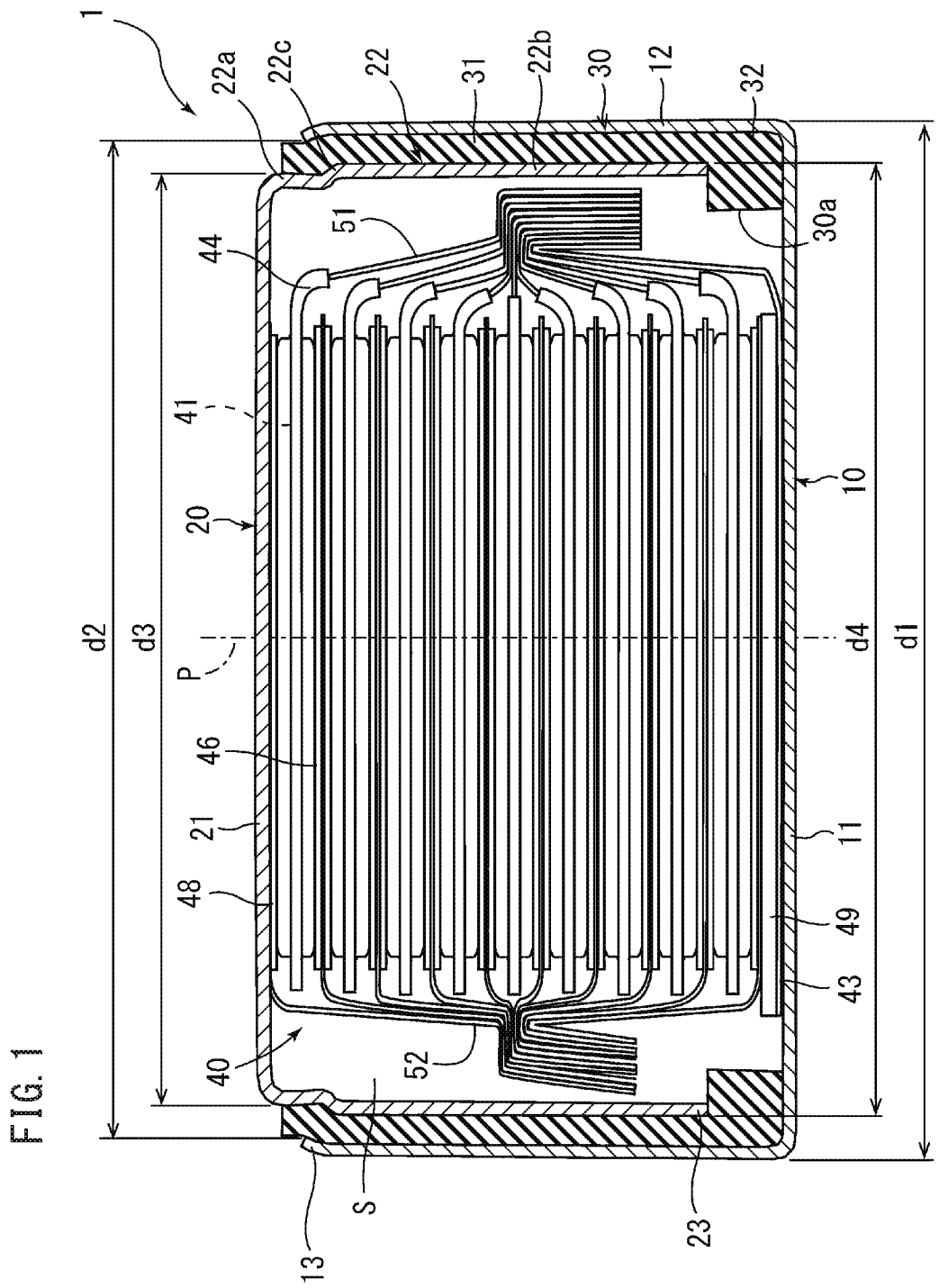
FIG. 1 is a cross-sectional view illustrating an outline structure of an embodiment of a coin-type battery that is formed by a manufacturing method of a coin-type battery according to the present invention.

Embodiments of the present invention will be described in detail with reference to the accompanying drawings. In the drawings, the same or corresponding parts are denoted by the same reference sign and the description of the parts is not repeated.

<Entire Structure>

FIG. 1 is a cross-sectional view illustrating an outline structure of an embodiment of a coin-type battery that is formed by a manufacturing method of a coin-type battery according to the present invention. This coin-type battery 1 includes a positive electrode can 10 as an exterior can having a closed end cylindrical shape, a negative electrode can 20 as a sealing can that covers an opening of the positive electrode can 10, a gasket 30 that is sandwiched between the positive electrode can 10 and the negative electrode can 20, and an electrode body 40 (a power generation element) that is housed in a housing space S formed between the positive electrode can 10 and the negative electrode can 20. Therefore, the coin-type battery 1 is made into a flat coin shape in which a dimension in a radial direction is larger than a dimension in a height direction by fitting the positive electrode can 10 and the negative electrode can 20 together. In the housing space S that is formed between the positive electrode can 10 and the negative electrode can 20 of the coin-type battery 1, in addition to the electrode body 40, a non-aqueous electrolyte (not illustrated) is also sealed. Note that the reference sign P in FIG. 1 denotes an axis that extends in the height direction of the coin-type battery 1. In the following description, in the coin-type battery 1, an axial direction is the height direction and a direction that is orthogonal to the axial direction is the radial direction.

The positive electrode can 10 is made of a metallic material, such as stainless (for example, SUS316 or the like). Ni-plating can be applied to an outer surface of the positive electrode can 10 and the positive electrode can 10 is formed to have a closed end cylindrical shape by press-forming. The positive electrode can 10 includes a circular bottom portion 11 and a cylindrical peripheral wall portion 12 formed continuously from an outer periphery of the bottom portion 11. The peripheral wall portion 12 is provided so as to extend from an outer peripheral end of the bottom portion 11 in the height direction of the coin-type battery 1 in a longitudinal-sectional view (a state illustrated in FIG. 1). That is, the peripheral wall portion 12 extends from the bottom portion 11 in the axial direction. Also, the positive electrode can 10 has an opening on an opposite side to the bottom portion 11 in the axial direction.

As will be described later, in a state in which the gasket 30 is sandwiched between the positive electrode can 10 and the negative electrode can 20, an open end portion 13 (an end portion of the peripheral wall portion 12, which is located closer to the opening) of the peripheral wall portion 12 is deformed so as to tilt inwardly in a radial direction of the positive electrode can 10, and thereby, the positive electrode can 10 is caulked to the negative electrode can 20.

The negative electrode can 20 is also made of a metallic material, such as stainless (for example, NAS64 or the like). Ni-plating can be applied to an outer surface of the negative electrode can 20 and the negative electrode can 20 is formed to have a closed-end cylindrical shape by press-forming. The negative electrode can 20 includes a substantially cylindrical side wall portion 22 an outer diameter of which is smaller than that of the peripheral wall portion 12 of the positive electrode can 10 and a circular flat portion 21 that closes one of openings of the side wall portion 22. Similar to the positive electrode can 10, the side wall portion 22 is provided so as to extend from an outer peripheral end of the flat portion 21 in the height direction of the coin-type battery 1 in the longitudinal-sectional view. That is, the side wall portion 22 extends from the flat portion 21 in the axial direction. Also, the negative electrode can 20 has an opening on an opposite side to the flat portion 21 in the axial direction.

Note that the side wall portion 22 extends in the axial direction without being folded in an edge portion. That is, the negative electrode can 20 is a so-called straight can without a fold portion in the edge portion of the side wall portion 22.

A diameter expansion portion 22b a diameter of which is larger than that of a base end portion 22a that is located closer to the flat portion 21 is formed in the side wall portion 22. That is, in the side wall portion 22, a stepped shoulder portion 22c that expands in the radial direction is formed between the base end portion 22a and the diameter expansion portion 22b. In the structure of this embodiment, the peripheral wall portion 12 of the positive electrode can 10 is pressed against the side wall portion 22 in the radial direction in a state in which the gasket 30, which will be described later, is sandwiched therebetween.

Note that, in the peripheral wall portion 12 of the positive electrode can 10, the open end portion 13 is largely displaced in the radial direction, as compared to the other portions of the peripheral wall portion 12, and thereby, a portion of a pressing force by the peripheral wall portion 12 of the positive electrode can 10 can be also applied to the shoulder portion 22c of the negative electrode can 20. Therefore, an open end portion 23 (an end portion of the side wall portion 22, which is located closer to the opening) of the side wall portion 22 of the negative electrode can 20 sandwiches a gasket bottom portion 32 of the gasket 30, which will be described later, with the bottom portion 11 of the positive electrode can 10.

Next, embodiments that are considered suitable for realizing an increased capacity and excellent sealing properties in a coin-type battery that is formed by a manufacturing method of a coin-type battery according to the present invention will be specifically described below.

An external diameter d1 of the bottom portion 11 of the positive electrode can 10 and an external diameter d3 of the flat portion 21 of the negative electrode can 20 preferably satisfy $0.8 \leq d3/d1 \leq 0.9$.

In this embodiment, the external diameter d1 of the bottom portion 11 of the positive electrode can 10 is substantially equal to an external diameter of the coin-type battery 1. Therefore, a ratio of an internal space of the negative electrode can 20 to an actual volume (a volume that is calculated from external dimensions of the coin-type battery 1) of the coin-type battery 1 can be increased by making the external diameter d3 of the flat portion 21 of the negative electrode can 20 to be 80% or more of the external diameter d1 of the bottom portion 11 of the positive electrode can 10. That is, a ratio of the housing space S of the electrode body 40 to the actual volume of the coin-type battery 1 can be made large by causing $d3/d1 \geq 0.8$ to be satisfied. Thus, a battery capacity of the coin-type battery 1 can be increased.

On the other hand, the external diameter d3 of the flat portion 21 of the negative electrode can 20 is preferably 90% or less of the external diameter d1 of the bottom portion 11 of the positive electrode can 10 and is more preferably 88% or less. Thus, the open end portion 13 of the peripheral wall portion 12 of the positive electrode can 10 can be displaced by a certain amount or more in the radial direction and thus be caulked to the side wall portion 22 of the negative electrode can 20. Therefore, in the coin-type battery 1, good sealing properties can be ensured.

An external diameter d4 of the open end portion 23 in the side wall portion 22 of the negative electrode can 20 and an inner diameter d2 of the open end portion 13 in the peripheral wall portion 12 of the positive electrode can 10 that is in a state of being caulked to the negative electrode can 20 with the gasket 30 sandwiched therebetween preferably satisfy $0.98 \leq d2/d4 \leq 1.06$.

A relation between the external diameter d4 of the open end portion 23 in the side wall portion 22 of the negative electrode can 20 and the inner diameter d2 of the open end portion 13 in the peripheral wall portion 12 of the positive electrode can 10 varies depending on a fitting structure of the peripheral wall portion 12 of the positive electrode can 10 with respect to the side wall portion 22 of the negative electrode can 20. For example, in a structure of a known coil-type battery in which a peripheral wall portion of a positive electrode can is caulked to a shoulder portion of a side wall portion of a negative electrode can and a gasket is pressed between an open end portion of a side wall portion of a sealing can and a bottom portion of an exterior can, thereby sealing the battery, a value of d2/d4 is a small value, that is, about 0.9.

In contrast, in this embodiment, the peripheral wall portion 12 of the positive electrode can 10 is displaced in the radial direction, and thereby, the peripheral wall portion 12 of the positive electrode can 10 is pressed against the side wall portion 22 of the negative electrode can 20. That is, the peripheral wall portion 12 of the positive electrode can 10 is fitted to the side wall portion 22 of the negative electrode can 20 in the radial direction.

In the above described fitting structure, the relation between the inner diameter d2 of the open end portion 13 in the peripheral wall portion 12 of the positive electrode can 10 and the external diameter d4 of the open end portion 23 in the side wall portion 22 of the negative electrode can 20 is made to satisfy $0.98 \leq d2/d4 \leq 1.06$, and thereby, a force that presses the gasket 30 by the peripheral wall portion 12 of the positive electrode can 10 in the radial direction is increased. Thus, sealing properties of the gasket 30 arranged between the peripheral wall portion 12 of the positive electrode can 10 and the side wall portion 22 of the negative electrode can 20 can be improved.

When the value of d2/d4 is smaller than 0.98, a pressing force concentrates in a region of a portion, such as the open end portion 23 of the side wall portion 22 of the negative electrode can 20 or the like. Therefore, there is a probability that the force that presses the gasket 30 by the peripheral wall portion 12 of the positive electrode can 10 in the radial direction is reduced and sealing properties of the entire battery are reduced.

On the other hand, when the value of d2/d4 is larger than 1.06, caulking between the peripheral wall portion 12 of the positive electrode can 10 and the side wall portion 22 of the negative electrode can 20 is insufficient. Therefore, also in this case, there is a probability that the sealing properties of the entire battery are reduced.

Furthermore, the external diameter d3 of the flat portion 21 of the negative electrode can 20 and the external diameter d4 of the open end portion 23 in the side wall portion 22 of the negative electrode can 20 preferably satisfy d3/d4≥0.85.

Also, a relation between the external diameter d3 of the flat portion 21 of the negative electrode can 20 and the external diameter d4 of the open end portion 23 in the side wall portion 22 of the negative electrode can 20 varies depending on the fitting structure of the peripheral wall portion 12 of the positive electrode can 10 with respect to the side wall portion 22 of the negative electrode can 20. For example, in a structure of a known coin-type battery in which a peripheral wall portion of a positive electrode can is caulked to a shoulder portion of a side wall portion of a negative electrode can, the shoulder portion is designed to have a certain width dimension or more and a value of d3/d4 is about 0.8.

In contrast, in this embodiment, as described above, the peripheral wall portion 12 of the positive electrode can 10 is fitted to the side wall portion 22 of the negative electrode can 20 in the radial direction. Therefore, in the radial direction of the coin-type battery 1, a projection dimension of the shoulder portion 22c in the side wall portion 22 of the negative electrode can 20 can be made small, as compared to a known structure, a dead space other than a necessary space used for housing the electrode body 40 can be reduced, and the capacity of the battery can be increased. From the above described viewpoint, the value of d3/d4 is more preferably 0.87 or more and, particularly, is preferably 0.9 or more.

However, the shoulder portion 22c the projection dimension of which is made to be a predetermined dimension or more causes the open end portion 23 of the side wall portion 22 of the negative electrode can 20 to generate a force that presses a gasket bottom portion 32, which will be described later, against the bottom portion 11 of the positive electrode can 10, and therefore, in order to ensure constant sealing properties between the gasket bottom portion 32 and the bottom portion 11 of the positive electrode can 10, the value of d3/d4 is preferably 0.97 or less.

As described above, the fitting structure in the coin-type battery 1 can be downsized by making the projection dimension of the shoulder portion 22c in the side wall portion 22 of the negative electrode can 20 smaller in the radial direction of the coin-type battery 1. Therefore, it is possible to realize downsizing of the coin-type battery 1 while increasing the housing space S in which the electrode body 40 is housed.

Note that, in this embodiment, the term "external diameter" means a diameter of a target portion in an outermost circumference position in a radial direction. The term "inner diameter" means a diameter of a target portion in an innermost position in the radial direction. In FIG. 1, the dimensions of d1 to d4 are specifically illustrated.

In order to increase the ratio of the housing space S of the electrode body 40 to the actual volume of the coin-type battery 1, a value of d3/d1 is more preferably 0.81 or more and, particularly, is preferably 0.82 or more. On the other hand, in order to provide better caulking of the open end portion 13 in the peripheral wall portion 12 of the positive electrode can 10 and thereby improve sealing properties, the value of d3/d1 is more preferably 0.88 or less, particularly, is preferably 0.87 or less, and is most preferably 0.85 or less.

Also, in order to provide a better pressing force by the peripheral wall portion 12 of the positive electrode can 10 in the radial direction, the value of d2/d4 is more preferably 0.99 or more and, particularly, is preferably 1 or more. On the other hand, in order to ensure a necessary caulking amount, the value of d2/d4 is more preferably 1.05 or less and, particularly, is preferably 1.03 or less.

The gasket 30 can be formed of, for example, in addition to a polyolefin resin, such as polypropylene (PP) or the like, a resin, such as polyamide, polyphenylene ether (PEE), polysulfone (PSF), polyarylate (PAR), polyethersulfone (PES), polyphenylene sulfide (PPS), poly ether ether ketone (PEEK), tetrafluoroethylene-perfluoroalkoxy-ethylene copolymer (PFA), or the like. The gasket 30 is preferably formed of a heat-resistant resin with a melting point or a decomposition temperature of which is 200° C. or more to prevent reduction in sealing properties at high temperature.

Figure 6:
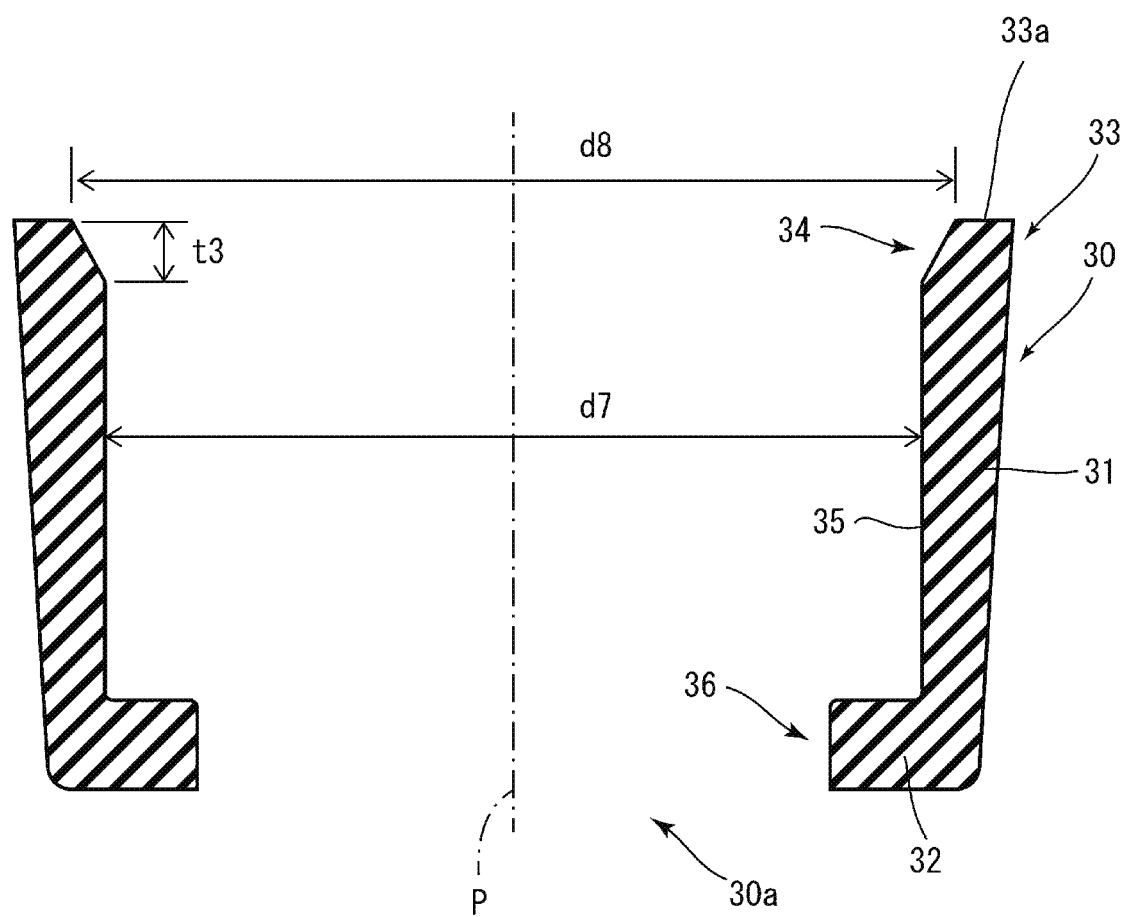
FIG. 6 is a cross-sectional view illustrating an outline structure of a gasket that is used for a coin-type battery according to the present invention.

The gasket 30 includes a gasket peripheral wall portion 31 and the gasket bottom portion 32. FIG. 6 is a cross-sectional view illustrating an outline structure of the gasket 30 before the coin-type battery is assembled.

The gasket peripheral wall portion 31 is formed to have a cylindrical shape that extends in the axial direction. The gasket peripheral wall portion 31 is arranged between the peripheral wall portion 12 of the positive electrode can 10 and the side wall portion 22 of the negative electrode can 20. The gasket bottom portion 32 is formed to have an annular shape that extends from one of end portions of the gasket peripheral wall portion 31 in the axial direction toward inside of the gasket peripheral wall portion 31. That is, the gasket 30 has a hole 30a surrounded by the gasket bottom portion 32. Thus, the gasket 30 is formed as an annular body which has a hook-shaped cross section. The gasket bottom portion 32 is sandwiched between the open end portion 23 in the side wall portion 22 of the negative electrode can 20 and the bottom portion 11 of the positive electrode can 10.

As illustrated in FIG. 1, the gasket 30 is located outside the side wall portion 22 of the negative electrode can 20 in a state in which the gasket 30 is sandwiched between the positive electrode can 10 and the negative electrode can 20. Note that, although not illustrated in FIG. 1, when the positive electrode can 10 and the negative electrode can 20 are sealed, the gasket bottom portion 32 is pressed by the open end portion 23 of the side wall portion 22 of the negative electrode can 20, and therefore, a portion of the gasket bottom portion 32, which has been deformed, contacts an inner circumference side of the side wall portion 22 near the open end portion 23.

Figure 2:
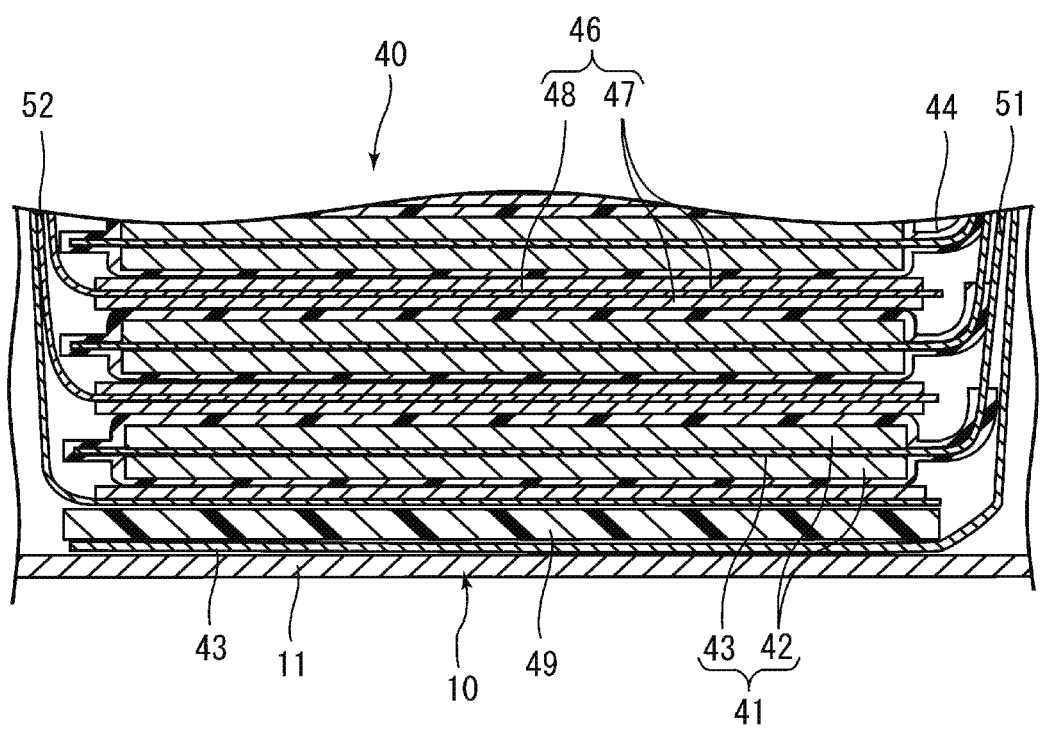
FIG. 2 is a partial enlarged cross-sectional view illustrating an enlarged cross-section of a structure of an electrode body in the coin-type battery illustrated in FIG. 1.

As illustrated also in FIG. 2, the electrode body 40 is formed by alternately stacking a substantially disk-shaped positive electrode 41 of which is housed in a bag-shaped separator 44 and a disk-shaped negative electrode 46 in the height direction of the coin-type battery 1. Thus, the electrode body 40 as a whole has a substantially columnar shape that extends in the axial direction. Also, the electrode body 40 is formed by stacking the positive electrodes 41 and the negative electrodes 46 such that both end surfaces of the electrode body 40 in the axial direction are negative electrodes.

As illustrated in FIG. 2, the positive electrode 41 is a member in which a positive electrode active material layer 42 containing a positive electrode active material, such as, for example, lithium cobalt oxide or the like, is formed on both sides of a positive electrode current collector 43 made of a metal foil, such as aluminum or the like.

As illustrated in FIG. 2, the negative electrode 46 is a member in which a negative electrode active material layer 47 containing a negative electrode active material, such as graphite or the like, is formed on both sides of a negative electrode current collector 48 made of a metal foil, such as copper or the like. However, each of the negative electrodes that are located in both of end portions of the substantially columnar electrode body 40 in an axial direction has the negative electrode active material layer 47 on only one surface side of the negative electrode current collector 48 such that the negative electrode current collectors 48, 48 are located in the end portions of the electrode body 40 in the axial direction. That is, the negative electrode current collectors 48, 48 are exposed at both ends of the substantially columnar electrode body 40. One of the negative electrode current collectors 48 of the electrode body 40 is positioned on the bottom portion 11 of the positive electrode can 10 via the positive electrode current collector 43 and an insulation sheet 49 (see FIG. 1 and FIG. 2). The other negative electrode current collector 48 of the electrode body 40 abuts on the flat portion 21 of the negative electrode can 20 in a state in which the electrode body 40 is arranged between the positive electrode can 10 and the negative electrode can 20 (see FIG. 1).

The separator 44 is a bag-shaped member that is formed to have a substantially circular shape in a plan view and is formed to have a size with which the separator 44 can house the substantially disk-shaped positive electrode 41. The separator 44 is formed of a microporous thin film made of polyethylene that is excellent in insulation properties. As described above, the separator 44 is formed of a microporous thin film, and thus, lithium ions can permeate the separator 44. The separator 44 is formed by bonding peripheral portions of the two substantially circular microporous thin films by heat welding or the like.

As illustrated in FIG. 1 and FIG. 2, in the positive electrode current collector 43 of the positive electrode 41, a conductive positive electrode lead 51 that extends toward the outside of the positive electrode current collector 43 in a plan view is integrally formed therewith. A portion of the positive electrode lead 51, which is located closer to the positive electrode current collector 43, is also covered by the separator 44. Note that the positive electrode current collector 43 in which the positive electrode active material layer 42 is not provided is arranged between the insulation sheet 49 and the bottom portion 11 of the positive electrode can 10. That is, the positive electrode current collector 43 electrically contacts the bottom portion 11 of the positive electrode can 10.

In the negative electrode current collector 48 of the negative electrode 46, a conductive negative electrode lead 52 that extends toward the outside of the negative electrode current collector 48 in a plan view is integrally formed therewith.

As illustrated in FIG. 1 and FIG. 2, the positive electrodes 41 and the negative electrodes 46 are stacked such that the positive electrode lead 51 of each of the positive electrodes 41 is located in one side and the negative electrode lead 52 of each of the negative electrodes 46 is located on an opposite side to the positive electrode lead 51.

As described above, in a state in which the plurality of positive electrodes 41 and negative electrodes 46 is stacked in the height direction of the coin-type battery 1, the plurality of positive electrode leads 51 is connected to one another by ultrasonic welding or the like such that edge sides thereof are superposed on one another in the height direction. Thus, the plurality of positive electrodes 41 is electrically connected to one another via the plurality of positive electrode lead 51 and each of the positive electrodes 41 and the positive electrode can 10 are electrically connected to one another. On the other hand, the plurality of negative electrode leads 52 is connected to one another by ultrasonic welding or the like such that edge sides thereof are superposed on one another in the height direction. Thus, the plurality of negative electrodes 46 is electrically connected to one another via the plurality of negative electrode leads 52 and each of the negative electrodes 46 and the negative electrode can 20 are electrically connected to one another.

(Manufacturing Method of Coin-Type Battery)

Next, a manufacturing method of the coin-type battery 1 according to the present invention, which is performed for manufacturing the coin-type battery 1 that has the above described structure, will be described.

Figure 3:
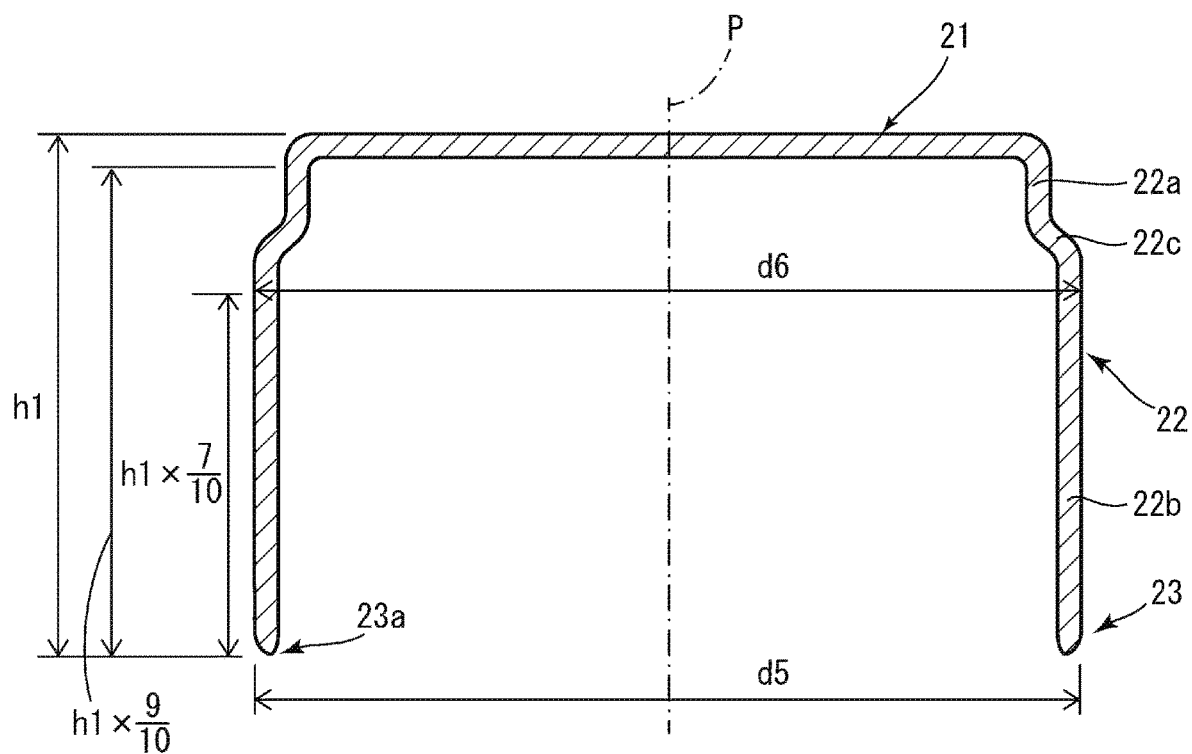
FIG. 3 is a cross-sectional view illustrating an outline structure of a sealing can that is used for a coin-type battery according to the present invention.
Figure 4:
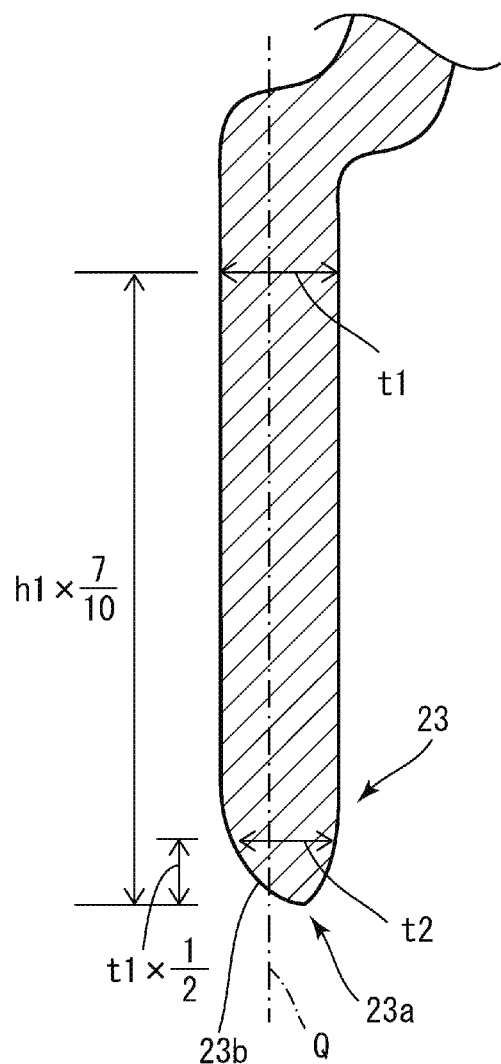
FIG. 4 is an enlarged partial cross-sectional view illustrating an enlarged cross section of a main portion of a side wall portion of a sealing can that is used for a coin-type battery according to the present invention.
Figure 5:
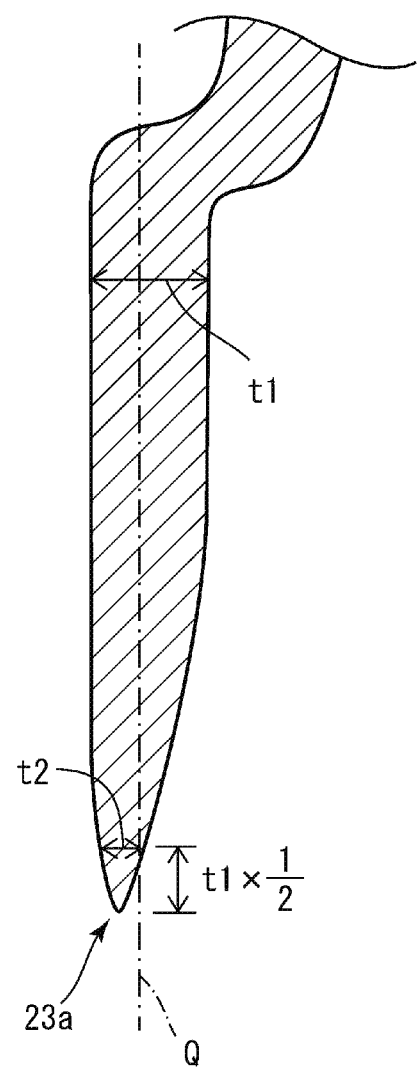
FIG. 5 is an enlarged partial cross-sectional view illustrating an enlarged cross section of a main portion of a side wall portion of a sealing can that is used for a comparison example of a coin-type battery.

FIG. 3 is a cross-sectional view illustrating an outline structure of a sealing can (a negative electrode can) that is used for assembling a battery. FIG. 4 and FIG. 5 are enlarged partial cross-sectional views each illustrating an enlarged cross section of a main portion (an enlarged diameter portion) of a side wall portion of the sealing can. FIG. 4 is an enlarged cross-sectional view illustrating an embodiment of a sealing can that is used in a manufacturing method of a coin-type battery according to the present invention and FIG. 5 is an enlarged partial cross-sectional view illustrating an example of a known sealing can.

As described above, the sealing can includes the substantially cylindrical side wall portion 22 and the circular flat portion 21 that closes one of openings of the side wall portion 22. The side wall portion 22 is provided so as to extend from an outer peripheral end of the flat portion 21 in a direction (a height direction) which is orthogonal to the flat portion 21 in a longitudinal-sectional view. That is, the side wall portion 22 extends from the flat portion 21 in the axial direction. The sealing can has an opening on an opposite side to the flat portion 21 in the axial direction. Note that the reference sign P in FIG. 3 denotes an axis that extends in the height direction of the sealing can.

Also, as described above, the side wall portion 22 includes the base end portion 22a that is located closer to the surface portion 21, the diameter expansion portion 22b that is located closer to the open end portion 23, and the shoulder portion 22c that is formed therebetween. A position in which the shoulder portion 22c is formed is preferably a position that is as close to the flat portion 21 as possible in order to increase the internal volume of the battery. That is, the diameter expansion portion 22b is preferably made as large as possible in the height direction. Specifically, when the height of the sealing can is h1 (mm), the diameter expansion portion 22b may be formed in a position higher than 7/10 of h1. That is, when, in the side wall portion 22 of the sealing can, the external diameter of the open end portion 23 is d5 (mm) and the external diameter in a position located at 7/10 of h1 from an edge 23a of the open end portion 23 toward the flat portion 21 is d6 (mm), the position of the shoulder portion 22c in the height direction is preferably a position in which d5 and d6 are the same. Note that, in reality, considering a manufacture tolerance, the diameter expansion portion 22b may be formed such that $-0.1 \leq d5-d6 \leq 0.1$ is satisfied.

On the other hand, when the position of the shoulder portion 22c is too close to the flat portion 21, sealing by the exterior can is difficult. Therefore, in the side wall portion 22, a portion located at 9/10 of h1 from the edge 23a of the open end portion 23 toward the flat portion 21 is preferably the base end portion 22a.

Also, as illustrated in FIG. 5, when the shape of the edge 23a of the open end portion 23 has a sharp angle, a problem in which, when the side wall portion 22 of the sealing can is fitted to the gasket, the edge 23a of the open end portion 23 scratches the gasket peripheral wall portion or a problem in which, when the edge 23a of the open end portion 23 presses the gasket bottom portion, a slit is made, or the like is likely to occur. Accordingly, a fluid leakage is likely to occur in a battery after assembled. Therefore, as illustrated in FIG. 4, the edge 23a of the side wall portion 22 of the sealing can preferably has a longitudinal-sectional shape an exterior shape of which is formed of a curved line in a cross-section. Note that the reference sign Q in FIG. 4 and FIG. 5 is a central line that indicates a central position of a thickness of the diameter expansion portion 22b in the radial direction.

In order not to make the shape of the edge 23a of the open end portion 23 with a sharp angle as much as possible, the sealing can may be formed such that, when a can thickness of the sealing can in a position at 7/10 of h1 from the edge 23a of the open end portion 23 toward the flat portion 21 is t1 (mm), the can thickness is maintained up to a position that is as close to the edge 23a of the open end portion 23 as possible.

Specifically, the edge 23a may be formed such that, when the can thickness in a position at ½ of t1 from the edge 23a of the open end portion 23 toward the flat portion 21 is t2 (mm), $t2/t1 \geq 0.9$ is satisfied. In general, an upper limit of a value of t2/t1 is 1 but, considering the manufacture tolerance or the like, the value of t2/t1 may be a value that is slightly larger than 1.

The above described problems are less likely to occur when the edge 23a of the open end portion 23 is located in a position closer to the inner circumference in the radial direction than the central line Q, as illustrated in FIG. 4, than when the edge 23a of the open end portion 23 is located in a position closer to the outer circumference in the radial direction than the central line Q, as illustrated in FIG. 5. Therefore, the edge 23a of the open end portion 23 is preferably formed in a position closer to the inner circumference in the radial direction than the central line Q in the radial direction.

Furthermore, as illustrated in FIG. 4, R is provided in an outer circumference side prat 23b of the open end portion 23, and thereby, the generation of damage in the gasket peripheral wall portion can be further suppressed. The curvature radius of R of the open end portion 23 is not particularly limited but, considering processability as well, it is considered that the curvature radius may be about 0.01 to 0.5 mm.

The sealing can that has the above described shape can be obtained by press-forming by adjusting well-known conditions when press-forming is performed.

Also, as illustrated in FIG. 6, the gasket 30 used for assembling a battery includes the gasket peripheral wall portion 31 and the gasket bottom portion 32. When the battery is assembled, the side wall portion 22 of the sealing can is fitted to the inner circumference side of the gasket peripheral wall portion 31, thereby, sealing of the coin-type battery 1. In order to enhance adhesion between an inner circumference surface 35 of the gasket peripheral wall portion 31 and an outer circumference surface of the diameter expansion portion 22b of the side wall portion 22 and improve sealing properties, when an inner diameter of the gasket peripheral wall portion 31 is d7 (mm), the inner diameter is adjusted such that d6>d7 is satisfied. That is, the inner diameter of the gasket peripheral wall portion 31 is set to be smaller than an external diameter of the diameter expansion portion 22b of the side wall portion 22 of the sealing can.

Note that, in order to further improve the sealing properties, d7 may be set smaller than d6 by a certain amount or more. Specifically, a difference d6–d7 between d6 and d7 is preferably 0.001 or more, is more preferably 0.005 or more, and, particularly, is preferably 0.008 or more.

Note that, as described above, in this embodiment, in the sealing can used for assembling the coin-type battery, an area of the diameter expansion portion 22b that contacts the gasket peripheral wall portion 31 is large. Therefore, even in a case in which the edge 23a of the open end portion 23 is formed to have the above described shape, if d7 is smaller than d6 by the certain amount or more, there is a probability that friction between the gasket peripheral wall portion 31 and the diameter expansion portion 22b is increased and a fitting failure, damage of the gasket, or the like occurs. If d6>d7 is satisfied, in order to make it easy to fit the side wall portion 22 of the sealing can to the gasket 30, as illustrated in FIG. 6, a cut off portion 34 may be formed in an inner circumference side of a upper end portion 33 of the gasket peripheral wall portion 31.

Although not particularly limited, in order to smoothly guide the edge 23a of the open end portion 23 of the sealing can toward the inside of the gasket peripheral wall portion 31 in the radial direction, the cut off portion 34 may be formed such that an inner diameter d8 (mm) in an end surface 33a of an upper end portion 33 of the gasket peripheral wall portion 31 is larger than d5. Normally the cut off portion 34 may be provided such that d8–d5 is in a range of about 0.1 or more and 1 or less.

Also, the cut off portion 34 may be designed such that, when the cut off portion 34 is viewed in the axial direction, a width t3 (mm) thereof is in a range of about 0.1 or more and 1 or less. In order to avoid a situation in which an inclination of the upper end portion 33 of the gasket peripheral wall portion 31 with respect to the end surface 33a is too gentle and it is difficult to achieve effects of the cut off portion 34, $t3 \geq (d8-d7)/6$ is preferably satisfied and $t3 \geq (d8-d7)/3$ is more preferably satisfied.

On the other hand, in order to avoid a situation in which the area of the cut off portion 34 is increased too much and the sealing properties are reduced, $t3 \leq (d8-d7) \times 2$ is preferably satisfied and $t3 \leq (d8-d7)$ is more preferably satisfied.

Note that, if a value of d7 is too much smaller than d6, even when the cut off portion 34 is formed, a problem in which fitting of the side wall portion 22 is difficult, a problem in which the gasket peripheral wall portion 31 is scratched when assembling the battery, a problem in which sealing is not possible, or like problem is likely to arise due to friction between the gasket peripheral wall portion 31 and the diameter expansion portion 22b. Therefore, it is necessary to design the sealing can and the gasket 30 such that a difference between d7 and d6 is not too large. Specifically, a value of d6–d7 is preferably 0.08 or less, is more preferably 0.05 or less and, particularly, is preferably 0.03 or less.

Figure 7:
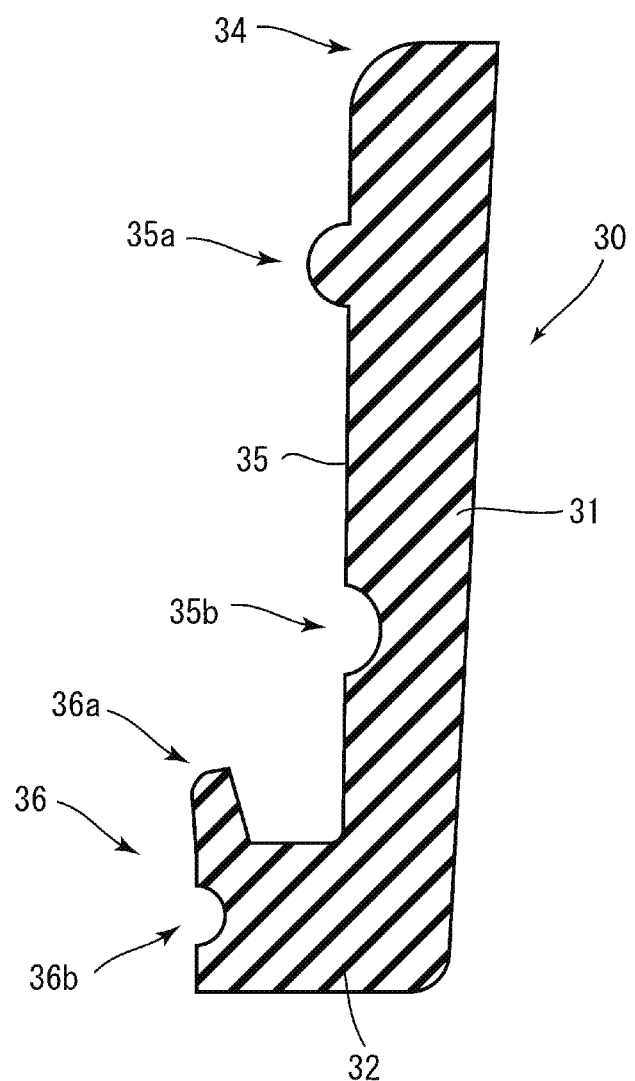
FIG. 7 is a cross-sectional view illustrating a modified example of the gasket that is used for a coin-type battery according to the present invention.

Unless a fitting failure of the sealing can, damage of the gasket, or reduction in sealing properties of the battery occurs, as illustrated in FIG. 7, a protruding portion 35a or a recessed portion 35b may be formed in the inner circumference surface 35 of the gasket peripheral wall portion 31 of the gasket 30. Similarly, also for the gasket bottom portion 32 of the gasket 30, a protruding portion 36a or a recessed portion 36b can be formed in an inner circumference surface portion 36.

Note that the inner diameter d7 of the gasket peripheral wall portion 31 is an inner diameter of a portion of the gasket peripheral wall portion 31 other than the cut off portion 34. Also, if the protruding portion or the recessed portion is formed in a portion of the inner circumference surface 35 of the gasket peripheral wall portion 31, the inner diameter d7 of the gasket peripheral wall portion 31 is an inner diameter of a portion of the gasket peripheral wall portion 31 other than the portion in which the protruding portion or the recessed portion is formed.

In FIG. 6, an embodiment in which the cut off portion 34 of the gasket peripheral wall portion 31 is formed to have a linear shape in a longitudinal-sectional view is illustrated, but a cross-section of the cut off portion 34 is not necessarily linear but may be curved in a longitudinal-sectional view. For example, as illustrated in FIG. 7, the cut off portion 34 may have a circular arc shape in a longitudinal-sectional view.

The thickness of the gasket peripheral wall portion 31 in the radial direction may be changed so as to be tapered by gradually increasing the external diameter of the gasket peripheral wall portion 31 from a side closer to the gasket bottom portion 32 toward a side closer to the upper end portion 33 in the height direction. Thus, when the opening end prat of the peripheral wall portion of the exterior can is caulked to the shoulder portion 22c, the sealing properties can be improved.

Note that the gasket 30 may be formed by injecting a resin material into a mold or the like.

Steps of manufacturing a coin-type battery using the sealing can (the negative electrode can) and the gasket will be described. Note that, as the exterior can (the positive electrode can), a general exterior can that includes a circular bottom portion and a cylindrical peripheral wall portion that is formed continuously from the bottom portion on an outer circumference and extends in the axial direction, and has an opening on an opposite side to the bottom portion may be used.

First, the plurality of plate-like positive electrodes 41 each of which is covered by the separator 44 and the plurality of plate-like negative electrodes 46 are stacked in the height direction to form a substantially columnar electrode body 40 illustrated in FIG. 1. The electrode body 40 is manufactured by a similar method to a known method, and therefore, description of a detailed manufacturing method will be omitted.

After the cylindrical gasket 30 is arranged in the positive electrode can 10, the electrode body 40 is arranged with the insulation sheet 49 or the like, and a non-aqueous electrolyte is injected. Then, the negative electrode can 20 is arranged so as to cover the opening of the positive electrode can 10. In the above described state, the peripheral wall portion 12 of the positive electrode can 10 is pressed inwardly in the radial direction against the side wall portion 22 of the negative electrode can 20 and is caulked thereto.

At this time, the peripheral wall portion 12 of the positive electrode can 10 and the side wall portion 22 of the negative electrode can 20 are fitted together by displacing the peripheral wall portion 12 of the positive electrode can 10 with respect to the side wall portion 22 of the negative electrode can 20 in the radial direction in a state in which the gasket 30 is arranged between the negative electrode can 20 and the positive electrode can 10 such that the gasket peripheral wall portion 31 is sandwiched between the side wall portion 22 of the negative electrode can 20 and the peripheral wall portion 12 of the positive electrode can 10 and the gasket bottom portion 32 is sandwiched between the open end portion 23 in the side wall portion 22 of the negative electrode can 20 and the bottom portion 11 of the positive electrode can 10.

Note that, when a force is applied in the thickness direction in a state in which the gasket bottom portion 32 is sandwiched between the open end portion 23 in the side wall portion 22 of the negative electrode can 20 and the bottom portion 11 of the positive electrode can 10, a portion of the gasket bottom portion 32, which is located near the inner circumference surface portion 36, is deformed in the thickness direction. Therefore, the deformed portion of the gasket bottom portion 32 contacts the inner circumference surface around the open end portion 23 of the side wall portion 22.

In the manner described above, the coin-type battery 1 that has the above described structure is obtained. In order to further improve the sealing properties of the battery, it is preferably to apply a general sealing agent to portions of the side wall portion 22 of the negative electrode can 20 and the peripheral wall portion 12 and the bottom portion 11 of the positive electrode can 10, which contact the gasket 30 in advance. Also, the sealing agent may be applied to the gasket 30.

When there is a scratch in the gasket, an effect of improving the sealing properties cannot be sufficiently achieved even by using the sealing agent. However, a manufacturing method of a coin-type battery according to the present invention can prevent damage of the gasket and a fitting failure of the gasket, and therefore, effects of the sealing agent can be effectively achieved.

As described above, the coin-type battery 1 that is formed through the above described steps is preferably designed such that the external diameter d1 of the peripheral wall portion 12 of the positive electrode can 10 and the external diameter d3 of the flat portion 21 of the negative electrode can 20 satisfy $0.8 \leq d3/d1 \leq 0.9$. Also, the coin-type battery 1 is preferably designed such that, in a state of being caulked to the negative electrode can 20 with the gasket 30 sandwiched therebetween, the inner diameter d2 of the open end portion 13 in the peripheral wall portion 12 of the positive electrode can 10 and the external diameter d4 of the open end portion 23 in the side wall portion 22 of the negative electrode can 20 satisfy $0.98 \leq d2/d4 \leq 1.06$.

Thus, the housing space S in the coin-type battery 1 can be made large, as compared to a known structure, and the capacity of the coin-type battery 1 can be increased. That is, a space inside of the negative electrode can 20 can be made large relative to external dimensions of the battery by causing a relation between the external diameter d3 of the flat portion 21 of the negative electrode can 20 and the external diameter d1 of the bottom portion 11 of the positive electrode can 10 to satisfy $0.8 \leq d3/d1 \leq 0.9$.

Also, the sealing properties can be increased in a battery structure in which the ratio of the internal space of the negative electrode can 20 to the actual volume of the battery is made large by causing the relation between the external diameter d4 of the open end portion 23 in the side wall portion 22 of the negative electrode can 20 and the inner diameter d2 of the open end portion 13 in the peripheral wall portion 12 of the positive electrode can 10 to be $0.98 \leq d2/d4 \leq 1.06$. Therefore, a compact sealing structure can be realized, and therefore, the battery capacity can be increased without enlarging the coin-type battery 1.

Note that, in the coin-type battery 1, an amount by which the peripheral wall portion 12 of the positive electrode can 10 is displaced due to being caulked is relatively small, and therefore, the shape of the negative electrode can 20 is kept such that an original shape of the sealing can is maintained. Therefore, the external diameter d 5 of the side wall portion 22 in the open end portion 23 in the original sealing can and the external diameter d4 of the side wall portion 22 in the open end portion 23 in the negative electrode can 20 of the coin-type battery 1 which has been assembled are substantially the same. Also, in order to cause a ratio (d3/d4) between the external diameters d3 and d4 of the flat portion 21 of the negative electrode can to be in a range of 0.85 or more and 0.97 or less, a ratio between the external diameter of the flat portion 21 in the original sealing can and d5 may be set to be substantially in a range of 0.85 or more and 0.97 or less.

WORKING EXAMPLES

Next, a manufacturing method of the coin-type battery 1 according to the present invention will be more specifically described using working examples and comparative examples below.

First Working Example

<Formation of Positive Electrode>

Using $LiCoO_2$ as a positive electrode active material, carbon black as a conduction assisting agent, and PVDF as a binder, a positive electrode is formed in a manner described below.

First, 93 parts by mass of $LiCoO_2$ and 3 parts by mass of carbon black are mixed and a mixture obtained thereby and a binder solution in which 4 parts by mass of PVDF has been dissolved in NMP in advance are mixed, thereby preparing a positive electrode mixture paste. The obtained positive electrode mixture paste is applied to both surfaces of a positive electrode current collector made of an aluminum foil having a thickness of 15 μm by an applicator. Note that the positive electrode mixture paste is applied onto the positive electrode current collector such that a coated portion and an uncoated portion are alternately arranged and also that a portion a front surface of which is a coated portion has a back surface that is also a coated portion. Subsequently, the applied positive electrode mixture paste is dried to form a positive electrode active material layer, roll press is performed thereon, and thereafter, the positive electrode current collector is cut into pieces each having a predetermined size, thereby obtaining strip positive sheets. Note that the positive electrode sheets are formed such that a portion of each of the positive electrode sheets on which the positive electrode active material layer is formed has an entire thickness of 140 μm.

Figure 8:
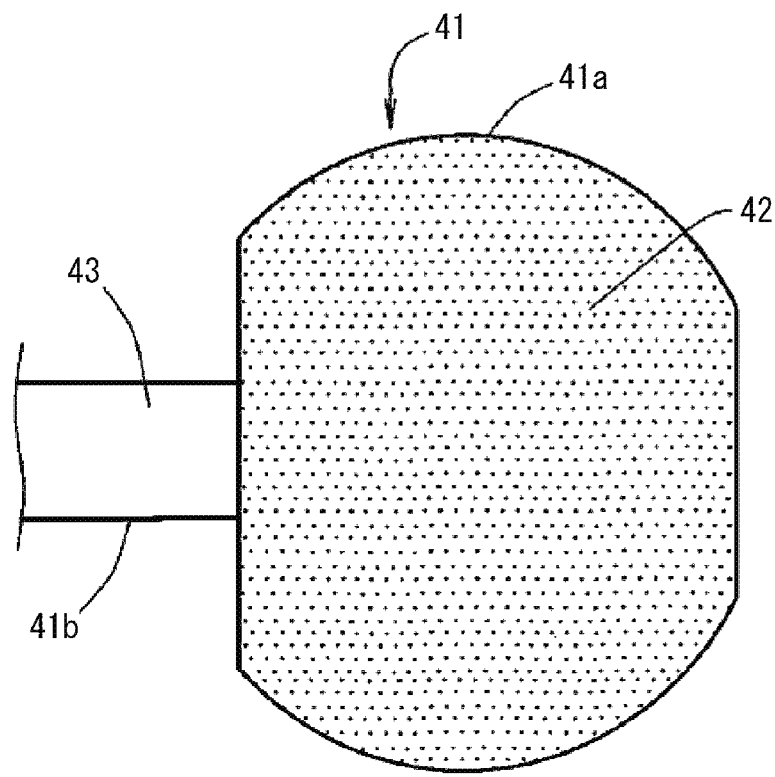
FIG. 8 is a plan view illustrating an outline structure of a positive electrode.

The strip positive electrode sheet is punched such that the portion on which the positive electrode active material layer is formed serves as a body portion (a diameter of an arc portion: 5.6 mm) and a portion on which the positive electrode active material layer is not formed serves as a positive electrode tab portion (a width: 2.0 mm), thereby obtaining a positive electrode. In FIG. 8, a plan view schematically illustrating a positive electrode after being punched is illustrated. The positive electrode 41 includes a body portion 41a in which the positive electrode active material layer 42 is formed on each of both surfaces of the positive electrode current collector 43 and a positive electrode tab portion 41b that protrudes from the body portion 41a and has a narrower width than that of the body portion 41a.

<Formation of Negative Electrode>

Using graphite as a negative electrode active material and PVDF as a binder, a negative electrode is formed in a manner described below.

First, 94 parts by mass of graphite and a binder solution in which 6 parts by mass of PVDF has been dissolved in NMP in advance are mixed to prepare a negative electrode mixture paste. The obtained negative electrode mixture paste is applied to one surface or both surfaces of a negative electrode current collector made of a copper foil having a thickness of 10 μm by an applicator. Note that the negative electrode mixture paste is applied onto the negative electrode current collector such that a coated portion and an uncoated portion are alternatively arranged and that, if the negative electrode mixture paste is applied to both surfaces of the current collector, a portion a front surface of which is a coated portion has a back surface that is also a coated portion. Subsequently, the applied negative electrode mixture paste is dried to form a negative electrode active material layer, roll press is performed thereon, and thereafter, the negative electrode current collector is cut into pieces each having a predetermined size, thereby obtaining strip negative sheets. Note that the negative sheets are formed such that a portion of the negative electrode sheet on which the negative electrode active material layer is formed has an entire thickness of 190 μm if the negative electrode active material layer is formed on both surfaces of the current collector and 100 μm if the negative electrode active material layer is formed on one surface of the current collector.

Figure 9:
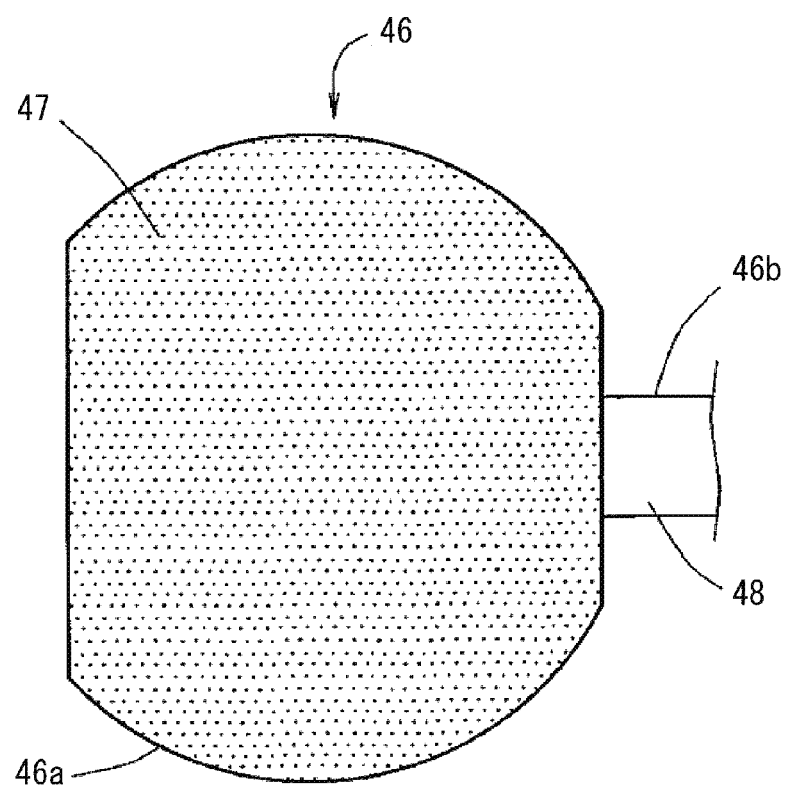
FIG. 9 is a plan view illustrating an outline structure of a negative electrode.

The strip negative electrode sheet is punched such that the portion on which the negative electrode active material layer is formed serves as a body portion (a diameter of an arc portion: 6.2 mm) and a portion on which the negative electrode active material layer is not formed serves as a negative electrode tab portion, thereby obtaining each of a negative electrode that includes a negative electrode active material layer on one surface of a current collector and a negative electrode that includes a negative electrode active material layer on both surfaces of the current collector. Note that a negative electrode of negative electrodes that have a negative electrode active material layer on one surface of a current collector, which is arranged on a side closer to an external can, is punched after a PET film (an insulation sheet) which has a thickness of 100 μm is bonded to an exposed surface of the strip negative electrode sheet in which the current collector is exposed. In FIG. 9, a plan view schematically illustrating the negative electrode after being punched is illustrated. The negative electrode 46 includes a body portion 46a in which the negative electrode active material layer 47 is formed on both surfaces or one surface of the negative electrode current collector 48 and a negative electrode tab portion 46b that protrudes from the body portion 46a and has a narrower width than that of the body portion 46a.

<Preparation of Non-Aqueous Electrolyte>

A non-aqueous electrolyte was prepared by dissolving $LiPF_6$ into a mixed solvent in which a volume ratio between ethylene carbonate and methylethyl carbonate is 1:2 in a concentration of 1.2 mol/l.

<Integration of Positive Electrode and Separator>

Figure 10:
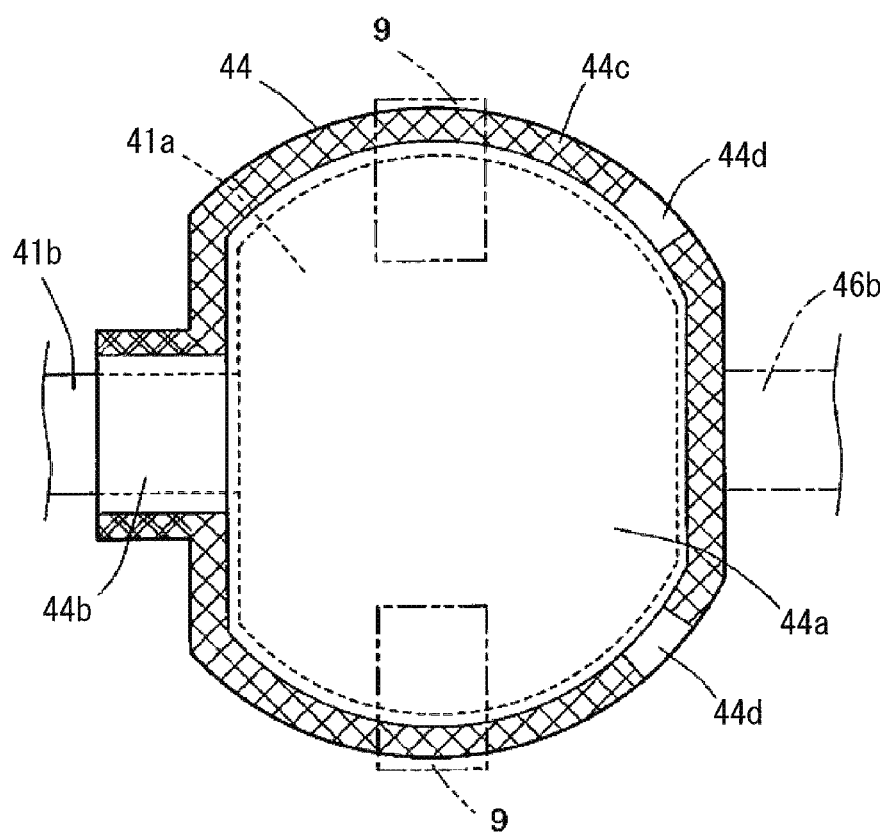
FIG. 10 is a plan view illustrating an outline structure of an electrode body.

In FIG. 10, a separator that was used in this working example is schematically illustrated. A microporous film (a thickness of 16 μm) made of polyethylene having the shape illustrated in FIG. 10 is arranged on each of both surfaces of the positive electrode 41 formed in the above described manner and a portion of a peripheral portion of a main body portion 44a of each of both of the separators 44 and a portion of an extending portion 44b are welded by hot pressing (a temperature of 170° C., a press time of 2 seconds) to form a joint portion in the portion of the peripheral portion of the main body portion 44a in each of the two separators 44 and the portion of the peripheral portion of the extending portion 44b, and thereby, the positive electrode 41 and the separator 44 are integrated.

FIG. 10 illustrates an electrode body in which the positive electrode 41, the negative electrode 46, and the separator 44 are stacked. In FIG. 10, the positive electrode 41 that is arranged under the separator 44 is indicted by a dotted line, the negative electrode tab portion 46b of the negative electrode 46, which is arranged further under them, is indicated by a long dashed short dashed line, and a binding tape 9 that restrains displacement of each component element of the electrode body is indicated by a long dashed double-short dashed line. The positive electrode 41 illustrated in FIG. 10 is stacked on the negative electrode 46 via one of a pair of separators 44 integrated with the positive electrode 41 sandwiched therebetween in the thickness direction in the electrode body. Note that, although not particularly illustrated in FIG. 10, the negative electrode is arranged under the separator 44 (a back side of a plane of FIG. 10).

The separator 44 illustrated in FIG. 10 includes a joint portion 44c (indicated by a lattice pattern in FIG. 10) welded to another separator 44 arranged thereunder (the back side of the plane of FIG. 10) with the positive electrode 41 (indicated by the dotted line in FIG. 10) sandwiched therebetween in the thickness direction thereof in the peripheral portion. That is, the pair of separators 44 arranged with the positive electrode 41 sandwiched therebetween in the thickness direction is welded with one another in the peripheral portion to have a bag shape, the positive electrode 41 is housed inside thereof, and thereby, the positive electrode 41 and the separators 44 are integrated.

Note that the separator 44 illustrated in FIG. 10 includes the main body portion 44a (that is, the main body portion 44a that has a larger area in a plan view than that of the body portion 41a of the positive electrode 41) which covers an entire surface of the body portion 41a of the positive electrode 41 and the extending portion 44b that protrudes from the main body portion 44a and covers a boundary portion between the body portion 41a and the positive electrode tab portion 41b of the positive electrode 41. Then, the joint portion 44c in which the pair of separators 44 arranged on the both surfaces of the positive electrode 41 is welded with one another is provided in at least portions of peripheral portions of the main body portion 44a and the extending portion 44b of the separators 44. A non-welding portion 44d in which the separators 44 are not welded with one another is provided in a portion of the peripheral portion of the main body portion 44a.

Note that, in this working example, the width of the joint portion 44c that is provided in each of the main body portion 44a and the extending portion 44b of the separator 44 is 0.3 mm and the length of the extending portion 44b from the main body portion 44a in the peripheral portion in a protruding direction is 0.5 mm. A portion of an outer edge of the main body portion 44a of the separator 44 that has a length of 90% of the entire length of the outer edge is the joint portion.

<Assembly of Battery>

Using eleven positive electrodes integrated with the above described separators, ten negative electrodes each in which a negative electrode active material layer was formed on each of both surfaces of a negative electrode current collector, and two negative electrodes (one of which was a negative electrode in which a PET film was bonded to an exposed surface in which a current collector was exposed) each in which a negative electrode active material layer was formed on one surface of a negative electrode current collector, the positive electrodes and the negative electrodes were alternately stacked such that the negative electrodes each in which the negative electrode active material layer was formed on one surface of a negative electrode current collector were located in most outer portions, and the entire electrodes were fastened by a binding tape, thereby an electrode body was obtained.

Next, a positive electrode tab portion of each of the positive electrodes, which protruded toward one side of the electrode body, and a negative electrode tab portion of each of the negative electrodes, which protruded in an opposite direction to a direction of protrusion of the positive electrode tab portion, were integrated by welding the tab portions in a state in which the positive electrode tab portions and the negative electrode tab portions were separately put together.

As an exterior can, a metal can including a circular bottom portion and a cylindrical peripheral wall portion formed to extend from an outer peripheral end of the bottom portion in a direction (the height direction) orthogonal to the bottom portion and having an opening on an opposite side to the bottom portion was formed by press-forming a plate formed of SUS316 and having a thickness of 0.1 mm. Note that Ni plating was performed on an outer surface of the exterior can. An external diameter of the bottom portion of the exterior can was 7.85 mm.

As a sealing can, the metal can illustrated in FIG. 3 including a circular flat portion and a side wall portion formed to extend from an outer peripheral end of the flat portion in a direction (the height direction) orthogonal to the flat portion and having an opening on an opposite side to the flat portion was formed by press-forming a plate formed of NAS64 and having a thickness of 0.1 mm. Note that Ni plating was performed on an outer surface of the sealing can. The height h1 of the sealing can was 3.25 mm and the external diameter of the flat portion thereof was 6.80 mm. A shoulder portion was formed in a position located at 2.68 mm ($^{82}/_{100}$ of h1) from an edge of an open end portion toward the flat portion. The external diameter d5 of the side wall portion in the open end portion was 7.10 mm, the external diameter d6 and the can thickness t1 of the side wall portion in a position located at $^{7}/_{10}$ of h1 from the edge of the open end portion toward the flat portion were 7.10 mm and 0.10 mm, respectively, and the can thickness t2 of the side wall portion in a position at ½ of t1 from the edge of the open end portion toward the flat portion was 0.10 mm. That is, a diameter expansion portion 22b of the side wall portion was formed such that d5−d6=0 and t2/t1=1 were satisfied.

Note that the edge of the open end portion was located in a position closer to an inner circumference in the radial direction than a central line in the radial direction in the diameter expansion portion.

An annular gasket made of polyphenylene sulfide and having a cross-sectional shape illustrated in FIG. 6 was used. Note that a cut off portion was provided in an inner circumference side of an upper end portion of a gasket peripheral wall portion. The inner diameter d7 in a portion of the gasket peripheral wall portion other than the cut off portion was 7.09 mm. The inner diameter d8 in an end surface of the upper end portion was 7.39 mm and the external diameter was 7.74 mm. The width t3 of the cut off portion in the axial direction was 0.15 mm. The thickness of the gasket bottom portion in the axial direction was 0.50 mm. The thickness of the gasket peripheral wall portion in the radial direction was tapered such that the thickness of the gasket peripheral wall portion in the radial direction was 0.25 mm in vicinity of the gasket bottom portion.

In the external can, the PET film of the negative electrode of the electrode body was arranged so as to face an inner surface of the exterior can, and the positive electrode tabs of the positive electrodes which were integrated were welded to the inner surface of the exterior can.

Next, the side wall portion of the sealing can was fitted to an inner side of the gasket peripheral wall portion of the gasket to achieve integration. After the non-aqueous electrolyte was injected into the sealing can to which the gasket was fitted, sealing was performed by putting the exterior can in which the electrode body was housed over the sealing can and caulking the peripheral wall portion of the exterior can to the side wall portion of the sealing can. Thus, a coin-type non-aqueous secondary battery having a similar structure to that of the battery illustrated in FIG. 1 and having an external diameter of 7.85 mm and a height of 4 mm was obtained.

Note that a commercially available sealing agent including a polyolefin thermoplastic elastomer was applied to portions of an outer circumference surface of the side wall portion of the sealing can and the inner surface of the exterior can, which were in contact with the gasket, in advance. Sealing was performed such that the sealing agent existed between the gasket and the sealing can, and between the gasket and the exterior can after the battery was assembled.

The external diameter d1 of the bottom portion of the exterior can in the battery was 7.85 (mm). The inner diameter d2 of the open end portion in the peripheral wall portion of the exterior can was 7.2 (mm). The external diameter d3 of the flat portion of the sealing can was 6.8 (mm). The external diameter d4 of the open end portion in the side wall portion of the sealing can was 7.1 (mm). Therefore, in the battery, d3/d1=0.866, d2/d4=1.014, and d3/d4=0.958 were satisfied.

Second Working Example

Similar to the first working example, a coin-type non-aqueous secondary battery was formed, except that the inner diameter d7 in a portion of the gasket peripheral wall portion other than the cut off portion 34 was made to be 7.04 mm by making the thickness of the gasket peripheral wall portion 31 in the radial direction entirely thicker.

First Comparative Example

Similar to the first working example, a coin-type non-aqueous secondary battery was formed, except that the external diameter d5 of the side wall portion in the open end portion of the sealing can was 7.25 mm and a difference (d5−d6) between d5 and d6 was −0.15.

Second Comparative Example

Similar to the first working example, a coin-type non-aqueous secondary battery was formed, except that the external diameter d5 of the side wall portion in the open end portion of the sealing can was 6.95 mm and the difference (d5−d6) between d5 and d6 was 0.15.

Third Comparative Example

Similar to the first working example, a coin-type non-aqueous secondary battery was formed, except that the inner diameter d7 of a portion of the gasket peripheral wall portion other than the cut off portion was made to be 7.15 mm by making the thickness of the gasket peripheral wall portion in the radial direction entirely thinner.

Fourth Comparative Example

Similar to the first working example, a coin-type non-aqueous secondary battery was formed, except that the can thickness t2 of the side wall portion in a position at ½ of t1 from the edge of the open end portion of the sealing can toward the flat portion was 0.03 mm and the diameter expansion portion 22b of the side wall portion was formed to have a sharp angle such that t2/t1=0.3 was satisfied.

Fifth Comparative Example

Similar to the first working example, a coin-type non-aqueous secondary battery was formed, except that the cut off portion was not provided in the inner circumference side of the gasket peripheral wall portion and the inner diameter d8 in the end surface of the upper end portion of the gasket peripheral wall portion was 7.09 mm.

100 batteries of each of the working examples and the comparative examples were formed. After the batteries were assembled, the batteries were stored in a temperature environment of 60° C. for 24 hours and, after storage, the number of batteries in which a fluid leakage was recognized was checked.

Note that, for the fifth comparative example, in many batteries, a fitting failure occurred when the side wall portion of the sealing can was fitted to the inner side of the gasket peripheral wall portion, and therefore, a fluid leakage caused by the storage was not checked.

Design dimensions of the sealing can and the gasket, correlations between the dimensions of the sealing can and the gasket, and results of fluid leakage check after the storage of the batteries in the working examples and the comparative examples are given in Table 1 and Table 2.

TABLE 1

| | Design Dimensions of Sealing Can and Gasket (mm) | | | | | | |
|---|---|---|---|---|---|---|---|
| | d5 | d6 | d7 | d8 | t1 | t2 | t3 |
| First Working Example | 7.10 | 7.10 | 7.09 | 7.39 | 0.10 | 0.10 | 0.15 |
| Second Working Example | 7.10 | 7.10 | 7.04 | 7.39 | 0.10 | 0.10 | 0.15 |
| First Comparative Example | 7.25 | 7.10 | 7.09 | 7.39 | 0.10 | 0.10 | 0.15 |
| Second Comparative Example | 6.95 | 7.10 | 7.09 | 7.39 | 0.10 | 0.10 | 0.15 |
| Third Comparative Example | 7.10 | 7.10 | 7.15 | 7.39 | 0.10 | 0.10 | 0.15 |
| Fourth Comparative Example | 7.10 | 7.10 | 7.09 | 7.39 | 0.10 | 0.03 | 0.15 |
| Fifth Comparative Example | 7.10 | 7.10 | 7.09 | 7.09 | 0.10 | 0.10 | 0 |

TABLE 2

| | Correlation between Dimensions in Searing Can and Gasket | | | | Number of Batteries in Which Fluid Leakage Occurred |
|---|---|---|---|---|---|
| | d5 − d6 | d6 − d7 | d8 − d5 | t2/t1 | (Number) |
| First Working Example | 0 | 0.01 | 0.29 | 1 | 0 |
| Second Working Example | 0 | 0.06 | 0.29 | 1 | 3 |
| First Comparative Example | 0.15 | 0.01 | 0.14 | 1 | 86 |
| Second Comparative Example | −0.15 | 0.01 | 0.44 | 1 | 53 |
| Third Comparative Example | 0 | −0.05 | 0.29 | 1 | 68 |
| Fourth Comparative Example | 0 | 0.01 | 0.29 | 0.3 | 85 |
| Fifth Comparative Example | 0 | 0.01 | −0.01 | 1 | — |

In the batteries of the first working example formed by a manufacturing method of a coin-type battery of the present invention, damage or the like of the gasket in assembling the battery could be prevented, and therefore, a fluid leakage in the battery after being assembled was suppressed. Therefore, the batteries with excellent sealing properties were achieved by the manufacturing method of a coin-type battery of the present invention. Specifically, in the batteries of the first working example in which the difference between d6 and d7 was 0.05 or less, the sealing properties could be further improved.

On the other hand, in the batteries of the first comparative example, the edge portion of the side wall portion of the sealing can was bent outwardly in the radial direction and a value of d5−d6 was larger than 0.1, and therefore, when the sealing can was fitted to the gasket, a minute scratch was made to the gasket by the edge portion of the side wall portion of the sealing can. Therefore, there were many batteries in which a fluid leakage occurred.

Also, in the batteries of the second comparative example, the edge portion of the side wall portion of the sealing can was bent inwardly in the radial direction and the value of d5−d6 was smaller than −0.1, and therefore, a pressing force in the gasket bottom portion by the sealing can in the battery after being assembled was insufficient, and thus, there were many batteries in which a fluid leakage occurred.

Also, in the batteries of the third comparative example, the inner diameter of the gasket peripheral wall portion was larger than the external diameter of the diameter expansion portion of the side wall portion of the sealing can, and therefore, when the exterior can was caulked to the sealing can, adhesion between the gasket peripheral wall portion and the side wall portion of the sealing can was insufficient, and thus, there were many batteries in which a fluid leakage occurred.

Also, in the batteries of the fourth comparative example, since the shape of the edge portion in the side wall portion of the sealing can had a sharp angle, a minute scratch was made to the gasket by the edge portion of the side wall portion of the sealing can when the sealing can was fitted to the gasket, a slit was made in the gasket bottom portion that was pressed by the edge portion of the side wall portion of the sealing can when the exterior can was caulked to the sealing can, and thus, there were many batteries in which a fluid leakage occurred. Also, in some batteries, a short circuit that was presumably caused by a slit that was made in the gasket bottom portion and contact of the edge portion of the side wall portion of the sealing can with the bottom portion of the exterior can was recognized.

Sixth Comparative Example

Using a sealing can having a known structure in which a side wall portion was folded back in an open end portion, an annular gasket having a U-shaped longitudinal section in accordance with the sealing can, and the same exterior can as that of the first working example, a coin-type battery was formed.

Note that, in the batteries of the sixth comparative example, a housing space in which an electrode body was housed was reduced as compared to the batteries of the first working example, and therefore, it was necessary to reduce the external diameter of the electrode body accordingly.

<Measurement of Battery Capacity>

For each of the batteries of the first working embodiment and the sixth comparative example, when a theoretical capacity of a positive electrode was 1 C (mAh), charging at a constant voltage of 4.2 V was conducted after charging at a constant current of 0.5 C (mA) was conducted up to 4.2 V, and the charging was terminated at a time when a current value reduced to reach 0.05 C. Also, each of the batteries after being charged was discharged with a constant current of 0.2 C (mA) and a discharge capacity until the voltage of the battery reached 3 V was measured. Measurement results are illustrated in Table 3.

TABLE 3

| | Discharge Capacity (mAh) |
|---|---|
| First Working Example | 18.0 |
| Sixth Comparative Example | 15.7 |

Among batteries formed by a manufacturing method of a coin-type battery of the present invention, in batteries each having an external diameter of 7.85 mm, the discharge capacity was increased by 15% as compared to a battery having the known structure.

Next, for the coin-type battery of the above described embodiment and a coin-type battery having a known structure (a gasket has a U-shaped cross section), coin-type batteries of the first and third working examples and the seventh to eleventh comparative examples were formed as described below, the battery capacity was checked for the first and third working examples and the seventh comparative example, and presence or absence of a short circuit and sealing properties were checked for the first working example and the eighth to eleventh comparative examples. Note that the coin-type batteries of the first working example in the following description are the same as the coin-type battery of the above described first working example, and therefore, description thereof will be omitted.

Third Working Example

External diameters of bottom portions in exterior cans of the batteries (which will be hereinafter merely referred to as external diameters of the batteries) were made to be 6.7 mm, 8.5 mm, 10 mm, and 11.5 mm, coin-type non-aqueous secondary batteries each having a similar structure to that of the battery illustrated in FIG. 1 were formed using electrode bodies in which sizes of body portions and tab portions in positive electrodes and negative electrodes and sizes of separators were varied in accordance with the external diameters of the batteries. Note that, in each of the batteries according to the third working example, a thickness of a gasket peripheral wall portion and a thickness of a gasket bottom portion were the same as those of the first working example and, using hook-shaped gasket a size of which was varied in accordance with the external diameter of the battery, the battery was assembled such that the value of d3/d1 and the value of d2/d4 were in a range of 0.8≤d3/d1≤0.88 and in a range of 0.98≤d2/d4≤1.06, respectively.

Seventh Comparative Example

Coin-type non-aqueous secondary batteries were obtained by making the external diameters of the batteries to be 6.7 mm, 7 mm, 10 mm, and 11.5 mm, using annular gaskets ("U-shaped gaskets") each having a U-shaped cross section, and also using electrode bodies external diameters of which were varied in accordance with diameters of the batteries. Each of the batteries according to the seventh comparative example was formed in a similar manner to that in the above described first working example, except for the diameters of the batteries, the diameters of the electrode bodies, and the gaskets. Note that, in each of the batteries of the seventh comparative example, the gasket existed also inside a side wall portion of a sealing can, and therefore, it was necessary to make the external diameter of the electrode body small, as compared to the batteries of the above described working examples having the same diameter.

<Measurement of Battery Capacity>

In the batteries of the first and third working examples and the seventh comparative example, when the theoretical capacity of the positive electrode was 1 C (mAh), charging of a constant voltage of 4.2 V was conducted after charging of a constant current of 0.5 C (mA) was conducted up to 4.2 V, and the charging was terminated at a time when a current value reduced to reach 0.05 C. Also, each of the batteries after being charged was discharged with a constant current of 0.2 C (mA) and a discharge capacity was measured until the voltage of the battery reached 3 V. Also, when, in the batteries having the above described external diameters, a capacity of a battery in which a "hook-shaped gasket" that is a gasket in this embodiment was C1 and a capacity of a battery having a "U-shaped gasket" that is a known gasket was C2, a difference between the capacity of the battery having the "hook-shaped gasket" and the capacity of the battery having the "U-shaped gasket" was calculated using an expression (C1−C2)/C2×100(%).

In Table 4, results of measurements of the capacities of the batteries each having the "hook-shaped gasket" and the "U-shaped gasket" and capacity differences between the batteries are given.

TABLE 4

| Battery External diameter (mm) | Capacity of Battery (mAh) | | Capacity Difference (%) |
|---|---|---|---|
| | Hook-shaped Gasket | U-shaped Gasket | |
| 11.5 | 43.9 | 40.3 | 8.9 |
| 10 | 31.9 | 28.9 | 10.4 |
| 8.5 | 21.8 | 19.3 | 13.0 |
| 7.85 | 18.0 | 15.7 | 14.6 |
| 7 | 13.6 | 11.6 | 17.2 |
| 6.7 | 12.2 | 10.3 | 18.4 |

It is understood from the results illustrated in Table 4 that, as the battery external diameter reduces, the capacity difference between the capacity of each of the batteries each having the "hook-shaped gasket" and the capacity of the corresponding one of the batteries having the "U-shaped gasket" increases. Also, it is understood that, in the batteries each having an external diameter of 10 mm or less, the capacity difference further increases, and specifically, in the batteries each having an external diameter of 8.5 mm or less, the capacity difference is remarkable. However, when the battery external diameter is less than 6 mm, it is difficult to assemble a battery, and therefore, the battery external diameter is preferably 6 mm or more.

Next, in order to check insulation properties and sealing properties of batteries using the "hook-shaped gasket", the eighth to eleventh comparative examples were formed in a manner described below.

Eighth Comparative Example

Similar to the first working example, a coin-type non-aqueous secondary battery was formed, except that the external diameter d3 of a flat portion of a sealing can was 5.9 mm and d3/d4=0.752 was satisfied.

Ninth Comparative Example

Similar to the first working example, a coin-type non-aqueous secondary battery was formed, except that the external diameter d3 of a flat portion of a sealing can was 7.08 mm and d3/d1=0.902 was satisfied.

Tenth Comparative Example

Similar to the first working example, a coin-type non-aqueous secondary battery was formed, except that the inner diameter d2 of an open end portion in a peripheral wall portion of an exterior can was 6.8 mm and d2/d4=0.958 was satisfied.

Eleventh Comparative Example

Similar to the first working example, a coin-type non-aqueous secondary battery was formed, except that the inner diameter d2 of an open end portion in a peripheral wall portion of an exterior can was 7.6 mm and d2/d4=1.070 was satisfied.

<Check of Presence or Absence of Insulation and Sealing Properties>

In each of the batteries of the first working example and the eighth to eleventh comparative examples, charging and discharging were performed under the same conditions as those of the above described battery capacity measurement to measure an internal resistance of each of the batteries after being discharged, and thereby, presence or absence of a short circuit in each of the batteries was checked.

Also, charging was performed under the same conditions as those of the above described battery capacity measurement, the batteries after being charged were stored in an environment of 60° C. and a relative humidity of 90% for 50 days, and thereafter, presence or absence of a fluid leakage in the batteries was checked.

Results of the above described check are illustrated in Table 5. Note that, in Table 5, each of batteries in which a short circuit and a fluid leakage did not occur is indicated by ○ and each of batteries in which a short circuit and a fluid leakage occurred is indicated by x.

TABLE 5

|  | d3/d1 | d2/d4 | Short Circuit | Fluid Leakage |
|---|---|---|---|---|
| First Working Example | 0.866 | 1.014 | ○ | ○ |
| Eighth Comparative Example | 0.752 | 1.014 | x | ○ |
| Ninth Comparative Example | 0.902 | 1.014 | ○ | x |
| Tenth Comparative Example | 0.866 | 0.958 | ○ | x |
| Eleventh Comparative Example | 0.866 | 1.070 | ○ | x |

As is understood from Table 5, in the battery of the first working example in which the values of d3/d1 and d2/d4 were in a range of 0.8≤d3/d1≤0.88 and in a range of 0.98≤d2/d4≤1.06, respectively, a short circuit and a fluid leakage did not occur. On the other hand, in the battery of the eighth comparative example, as compared to the battery of the first working example, a ratio of a housing space of an electrode body was small, and therefore, a short circuit occurred, and in the batteries of the ninth to eleventh comparative examples, a fluid leakage occurred due to reduction in sealing properties. As is clear from the foregoing, according to the present invention, a capacity of a small coin-type battery can be increased while maintaining sealing properties.

Other Embodiments

An embodiment of the present invention has been described above, but the above-described embodiment is merely an illustrative example of a preferred embodiment of the present invention. Therefore, the present invention is not limited to the above-described embodiment and the above-described embodiment can be appropriately modified and implemented without departing from the gist of the invention.

In the above described embodiment, the electrode body 40 has a structure in which the plurality of positive electrodes 41 and the plurality of negative electrodes 46 are alternately stacked, but a structure of an electrode body may be a structure other than the above described structure.

In the above described embodiment, the positive electrode 41 includes a positive electrode active material layer containing a positive electrode active material, such as lithium cobalt oxide or the like, and the negative electrode 46 includes the negative electrode active material layer 47 containing a negative electrode active material, such as graphite or the like. However, a structure of a positive electrode and a negative electrode may be a structure other than the above described structure.

Although, in the above described embodiment, the positive electrode can 10 is an exterior can and the negative electrode can 20 is a sealing can, reversely, a positive electrode can may be a sealing can and a negative electrode can may be an exterior can.

INDUSTRIAL APPLICABILITY

A coin-type battery according to the present invention is applicable to a structure in which a gasket is sandwiched between a sealing can and an exterior can.

REFERENCE SIGNS LIST

1 Coin-type battery
10 Positive electrode can (exterior can)
11 Bottom portion
12 Peripheral wall portion
13 Open end portion
20 Negative electrode can (sealing can)
21 Flat portion
22 Side wall portion
22$a$ Base end portion
22$b$ Diameter expansion portion
22$c$ Shoulder portion
23 Open end portion
23$a$ Tip (of open end portion)
23$b$ Outer circumference side portion (of open end portion)
30 Gasket
30$a$ Hole
31 Gasket peripheral wall portion
32 Gasket bottom portion
33 Upper end portion
33$a$ End surface
34 Cut off portion
35 Inner circumference surface
35$a$ Protruding portion
35$b$ Recessed portion
36 Inner circumference surface portion
36$a$ Protruding portion
36$b$ Recessed portion
40 Electrode body (power generation element)
P Axis
Q Central line
S Housing space

The invention claimed is:

1. A coin-type battery comprising:
an exterior can including a bottom portion and a cylindrical peripheral wall portion and having an opening on an opposite side to the bottom portion in an axial direction;
a sealing can which includes a flat portion and a cylindrical side wall portion and has an opening on an opposite side to the flat portion in the axial direction and of which a stepped shoulder portion that is located between the flat portion and the opening and expands in a radial direction is provided in the side wall portion;
a gasket at least a portion of which is arranged between the peripheral wall portion of the exterior can and the side wall portion of the sealing can; and
a power generation element arranged in a housing space formed by the exterior can and the sealing can, wherein the gasket includes
a gasket peripheral wall portion formed to have a cylindrical shape and arranged between the peripheral wall portion of the exterior can and the side wall portion of the sealing can, and
a gasket bottom portion arranged between the bottom portion of the exterior can and an open end portion of the side wall portion of the sealing can, and
the gasket is an annular body having a hook-shaped cross section, and
0.8≤d3/d1≤0.9 and 0.98≤d2/d4≤1.06 are satisfied,
wherein d1 (mm) is an external diameter of the bottom portion of the exterior can d2 (mm) is an inner diameter of the open end portion in the peripheral wall portion of the exterior can, d3 (mm) is an external diameter of the flat portion of the sealing can, and d4 (mm) is an external diameter of the open end portion in the side wall portion of the sealing can.

2. The coin-type battery according to claim 1, wherein d3/d4≥0.85 is satisfied.

3. The coin-type battery according to claim 1,
wherein the gasket is formed of a heat-resistant resin with a melting point or a decomposition temperature of which is 200° C. or more.

4. A manufacturing method of the coin-type battery according to claim 1, using:

an exterior can including a bottom portion and a cylindrical peripheral wall portion and having an opening on an opposite side to the bottom portion in an axial direction;

a sealing can which includes a flat portion and a cylindrical side wall portion and has an opening on an opposite side to the flat portion in the axial direction and of which a stepped shoulder portion that is located between the flat portion and the opening and expands in a radial direction is provided in the side wall portion; and a gasket including a gasket peripheral wall portion formed to have a cylindrical shape and a gasket bottom portion, and the gasket is an annular body having a hook-shaped cross section, wherein the manufacturing method of the coin-type battery comprises a step of fitting the peripheral wall portion of the exterior can and the side wall portion of the sealing can together by displacing the peripheral wall portion of the exterior with respect to the side wall portion of the sealing can in the radial direction in a state in which the gasket is arranged between the sealing can and the exterior can such that the gasket peripheral wall portion is sandwiched between the side wall portion of the sealing can and the peripheral wall portion of the exterior can and the gasket bottom portion is sandwiched between the open end portion in the side wall portion of the sealing can and the bottom portion of the exterior can.

* * * * *